April 7, 1970     H. V. ANTHONY ET AL     3,505,213

METHOD AND APPARATUS FOR PURIFYING A NATURAL BODY OF WATER

Filed Feb. 24, 1969     2 Sheets-Sheet 1

INVENTORS
HAROLD V. ANTHONY
GEORGE P. FULTON
BY
Young, Flynn & Tarolli
ATTORNEYS

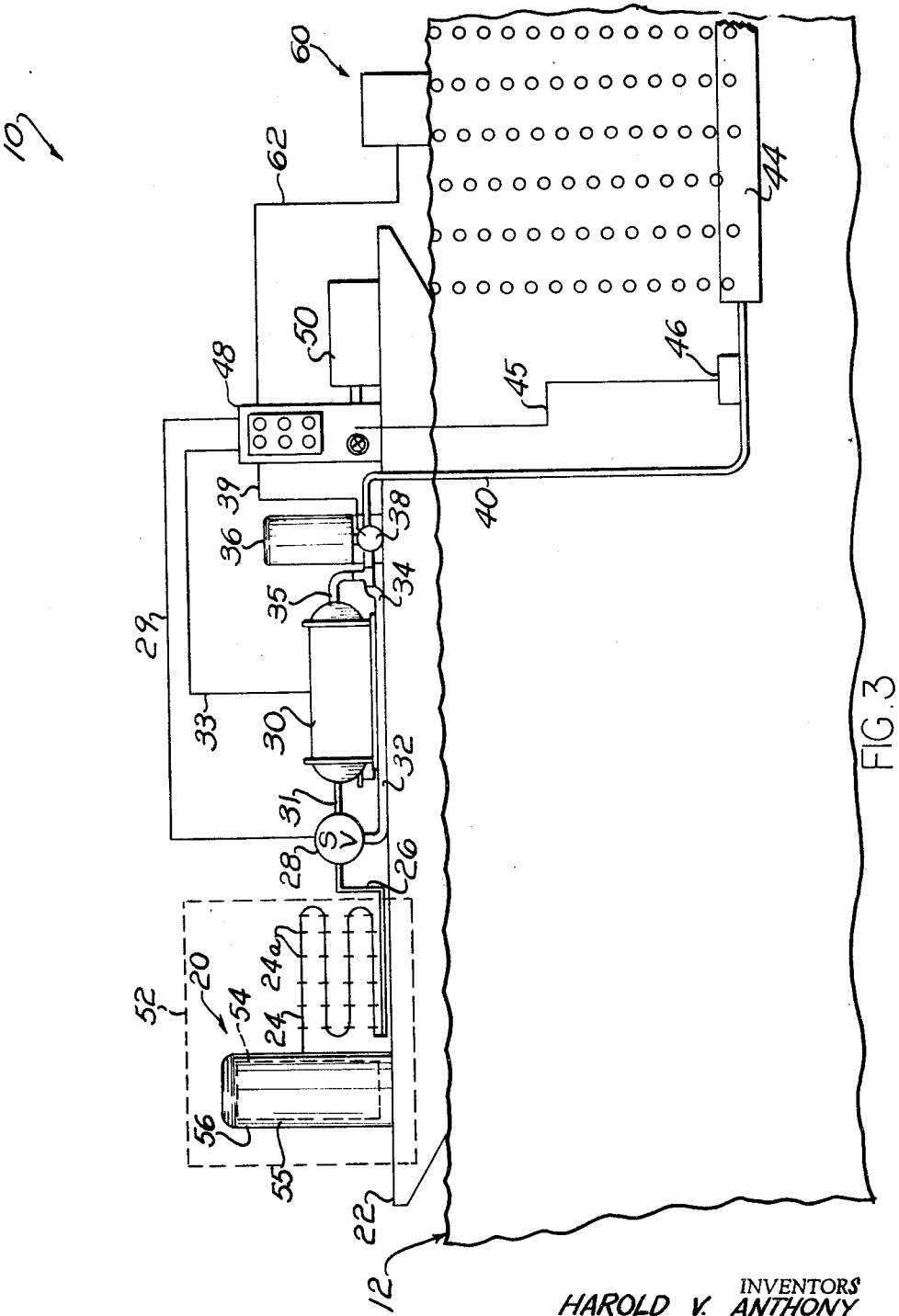

United States Patent Office 3,505,213
Patented Apr. 7, 1970

3,505,213
METHOD AND APPARATUS FOR PURIFYING A NATURAL BODY OF WATER
Harold V. Anthony and George P. Fulton, Littleton, Colo., assignors to Martin Marietta Corporation, New York, N.Y., a corporation of Maryland
Filed Feb. 24, 1969, Ser. No. 801,381
Int. Cl. C02b 1/34
U.S. Cl. 210—15          25 Claims

ABSTRACT OF THE DISCLOSURE

A method and apparatus for supplementing or accelerating the natural process of water purification in a natural body of water in situ includes the addition of oxygen to the natural body of water in situ. Liquor oxygen is converted to its gaseous state by the use of an atmospheric heat exchanger and is then diffused into the water to increase the natural oxidation of pollutants. During the occurrence of certain water conditions, gaseous oxidation catalysts and gaseous oxidizing agents are utilized to increase the speed and efficiency of the oxidation of pollutants. The oxygen and the catalysts and agents, when water conditions warrant, are simultaneously dissolved into the body of water. Sensor means are utilized to sense water conditions and vary the rate of flow of the gaseous oxygen, agents and catalysts to the water, as the water conditions vary so as to prevent oxygen from being lost from the surface of the water to the atmosphere.

---

The present invention relates to a method and apparatus for accelerating the natural process of purification of a natural body of water and, specifically, to a method and apparatus for adding oxygen and other matter to a natural body of water in situ to thereby accelerate and increase the efficiency of the oxidation of pollutants in the body of water.

It has been discovered that dissolved oxygen in a natural body of water is essential for the reduction, purification, and stabilization of waste or pollutants disposed in the water. The dissolved oxygen in the water is utilized both chemically and biochemically in the natural process of oxidation of pollutants disposed in the body of water. Depletion of the dissolved oxygen by chemical oxygen demand and biochemical oxygen demand is the most important single aspect of pollution in natural bodies of water. Therefore, the presence of dissolved oxygen in all natural bodies of water is of prime importance in maintaining water quality. Because of the great influx of pollutants into America's natural bodies of water, depletion of dissolved oxygen is taking place with the consequences being that pollutants disposed in the bodies of water are not oxidized efficiently. The pollutants remain in the water and the quality of the water rapidly diminishes. Not only does the concentration of the dissolved oxygen in the natural body of water effect the oxidation of the pollutants therein, but it is also metabolically essential to valuable types of aquatic life.

Although measures have been taken to reduce the influx of organic pollutants to natural bodies of water, these measures are very slow in producing results, and do not compensate for the pollutants that are now in the water bodies. Therefore, the process of adding oxygen to a natural body of water in situ can be effective in restoring natural bodies of water to their optimum conditions. If dissolved oxygen is allowed to work on pollutants in natural bodies of water in situ long enough, the water will be purified. However, the dissolved oxygen content that is present in natural bodies of water, such as the Great Lakes, is insufficient to oxidize the pollutants that are being dumped into the lakes. As an example, an average person uses 100 to 150 gallons of water per day. Therefore, a city of 30,000 people using approximately 3 million gallons of water per day which is discharged into natural water bodies, such as lakes, etc. The discharge of 3 million gallons of water per day containing average amounts of pollutants would require a shallow lake of at least 10 miles square to prevent the discharge of the pollutants from causing a dissolved oxygen deficit in the body of water. The effectively shallow area of many lakes, such as the Great Lakes, is not enough to prevent a dissolved oxygen deficit. Further, thermal stratification in the deeper lakes prevents effective oxygen diffusion into the hypoliminien which may become anaerobic. Thus, it can be seen that with the great use of water and the discharge of large amounts of pollutants into the natural bodies of water, a system is needed for removing the pollutants from the natural bodies of water.

The known prior art discloses means for aerating natural bodies of water in situ to attempt to overcome the dissolved oxygen deficit. These means effect oxygenation of the water in essentially two ways, aeration by the use of compressed air which is bubbled through the water, and by agitation wherein the water is stirred or agitated so as to trap oxygen from the atmosphere. However, neither of these means for accomplishing oxygenation is as efficient as the process contemplated herein. Moreover, the efficiency of the system utilizing air to oxygenate the water is very poor with respect to equipment requirements and power consumption in that costly compressors or agitators having large on site power requirements are needed.

While vague suggestions of oxygenating natural bodies of water in situ have been made, no practical system which is economically feasible has been developed. No known system incorporates means to control the concentration of oxygen in the natural body of water. It is beneficial to saturate a body of water up to its equilibrium concentration and to cease adding oxygen to the water when the dissolved oxygen concentration surpasses its equilibrium condition, since the dissolved oxygen will then tend to diffuse from the water to the atmosphere. Therefore, the failure of the prior art to even suggest means for controlling the oxygen concentration in a natural body of water in situ provides great practical and economic disadvantages.

The present invention takes advantage of the fact that the solubility of oxygen in water is determined to be proportional to the oxygen's partial pressure in the gas at the gas-water interface. For example, the solubility of oxygen gas in water at 20° C. is 31 milliliters per liter, which is about 41 milligrams per liter. If air is used as a source of $O_2$, however, the solubility at 20° C. is 18.7 milliliters per liter, of which 34% or 6.3 milliliters per liter is oxygen. Thus, it can be seen that the amount of oxygen soluble in water is five times greater using oxygen gas than when using air in the range of temperatures of natural water environments. Not only can more oxygen be dissolved in the water by using oxygen as opposed to aeration with air, but also the rate at which the oxygen is dissolver is accelerated by 3 to 30 times over that attainable using air as the aeration medium.

Moreover, the utilization of liquid oxygen, as contemplated by the present invention, further alleviates the problem associated with the requirement of large on site power sources or costly compressors. The present invention contemplates volatilizing the liquid oxygen and controlling the pressure of the volatilized oxygen. By volatilizing the oxygen at high pressures, the oxygenation of the water body could be accomplished essentially free of any on site power requirements and would be a great improvement both economically and technically over the prior art. Therefore, a system utilizing pure oxygen would be much more feasible from the economic standpoint than a system using air to oxygenate the water.

The present invention also contemplates the addition of ozone and oxygen to the body of water simultaneously. The prior art discloses the use of oxygen and/or ozone in sewage treatment facilities, industrial waste treatment facilities and domestic, commercial and industrial water treatment facilities. However, no practical attempt has been made to oxygenate or ozonate a natural body of polluted water in situ by using substantially pure oxygen gas with or without ozone or other gaseous or vaporous oxygenation catalysts or agents. The use of oxygen to oxygenate a natural body of water in situ is different from the prior art teaching of using oxygen to oxygenate sewage in that the dispersed nutrients found in the natural bodies of water do not offer the flocculent nutrient and substrate conditions or the solid-liquid interface density in concentrated organism-nutrient interactions which are the bases of the process of oxygenation of sewage. Thus, both the organisms treated and the bio-oxidation mechanisms that are utilized in sewage or industrial waste treatment are materially different from those contemplated by the present invention.

Moreover, while the process of ozonation or the utilization of oxidizing agents and/or oxidation catalysts has been utilized in reservoirs or other open holding basins, the practice has been limited to the objectives of odor control and to the destruction of pathogens after the water has been filtered and the gross pollutants removed. Thus, the prior art illustrates a method that is almost diametrically opposed to that offered hereinbelow, in that it is the gross pollutional materials themselves, in situ, which are being treated. The prior art illustrates removing these gross pollutional materials and then treating the water. The invention described hereinbelow treats these gross pollutants in situ in the natural body of water and converts them to lower molecular waste materials or forms that are more susceptible to biological oxidation or to further chemical degradation by ozonation.

It is, therefore, an object of the present invention to provide a new and improved method and apparatus for supplementing or accelerating the natural process of water purification in a natural body of water in situ which are efficient, practical, and economical and do not require separation of pollutants from the water.

It is a further object of the present invention to provide a new and improved method and apparatus for adding oxygen to a natural body of water in situ to increase the natural process of oxidation of pollutants and to simultaneously add an oxidative additive to the natural body of water in situ to increase the speed and efficiency of the oxidation process.

Another object of the present invention is to provide a new and improved method and apparatus for adding oxygen and ozone to a natural body of water in situ to increase the speed and efficiency of the oxidation of pollutants and wherein the ozone accelerates the direct chemical oxidation of pollutants.

A further object of the present invention is to provide a new and improved method and apparatus for adding oxygen and oxidation agents and/or oxidative catalytic agents to a natural body of water in situ to increase the speed and efficiency of the natural process of oxidation of pollutants therein and wherein a condition of the water is sensed and the flow of the oxygen and matter into the water is controlled in accordance with the condition of the water that is sensed.

Still another object of the present invention is to provide a new and improved method and apparatus for adding oxygen to a natural body of water in situ by volatilizing liquid oxygen to its gaseous state by the utilization of an atmospheric heat exchanger and wherein the gaseous oxygen is directed into the water at a predetermined depth beneath the surface of the natural body of water in situ.

A still further object of the present invention is to provide a new and improved method and apparatus for adding gaseous oxygen to a natural body of water in situ to increase the natural process of oxidation of pollutants by volatilizing liquid oxygen to its gaseous state by the utilization of an atmospheric heat exchanger and wherein the volatilization of the liquid oxygen and the addition of the gaseous oxygen to the water is controlled by a means for sensing water conditions.

Another object of the present invention is to provide a new and improved method and apparatus, as noted in the preceding paragraph, wherein the volume flow of the gaseous oxygen to the water is dependent upon the water condition of the natural body of water.

A further object of the present invention is to provide a new and improved method and apparatus for adding oxygen to a natural body of water in situ by volatilizing liquid oxygen to its gaseous state by the utilization of an atmospheric heat exchanger and for converting a portion of the oxygen to gaseous ozone and wherein the ozone and oxygen are simultaneously added to a natural body of water in situ to increase the speed and efficiency of the natural process of oxidation of pollutants.

Still another object of the present invention is to provide a new and improved method and apparatus for adding oxygen to a natural body of water in situ to thereby increase the natural process of oxidation of pollutants in the water, and wherein the flow of oxygen into the water is controlled so that oxygen lost to the atmosphere from the water will be minimal, if at all.

A still further object of the present invention is to provide a new and improved method and apparatus for adding oxygen to a natural body of water in situ to thereby increase the natural process of oxidation of pollutants in the water and wherein the flow of oxygen into the water is controlled so that the oxygen concentration in the water will be maintained at or below the equilibrium concentration of oxygen in the water, thereby minimizing the loss of oxygen from the water to the atmosphere.

These and other objects of the present invention will become more apparent upon a consideration of the following description of a preferred embodiment of the present invention taken in connection with the accompanying drawings wherein:

FIG. 3 illustrates one form of a preferred embodiment of the present invention that is utilized to replenish the dissolved oxygen content in a natural body of water by the use of liquid oxygen.

The present invention provides a method and apparatus for replenishing the dissolved oxygen content in a natural body of water in situ. The replenishment of the dissolved oxygen restores the water body to its optimum, recreational, aesthetic and commercial values. The present invention effects the oxygenating of a natural body of water in situ by the provision of storage and converter stations 10 located on the natural body of water or on land adjacent thereto.

Figure 1:
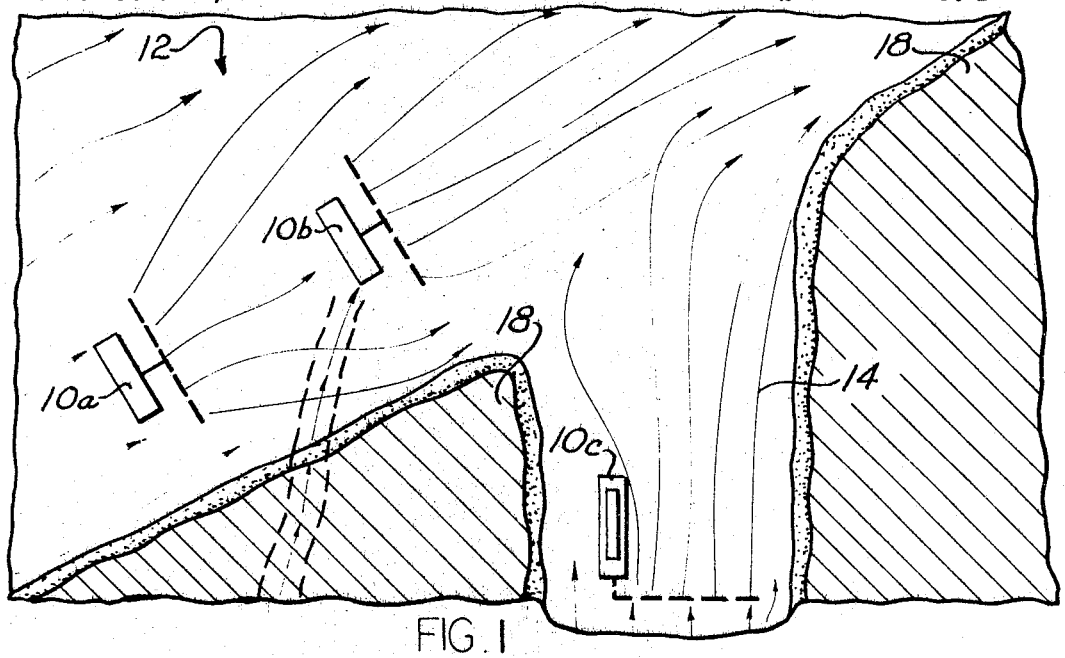
FIG. 1 is a schematic illustration showing the utilization of the present invention in a natural body of water in situ and showing the distribution of the dissolved oxygen by the natural currents of water.

In FIG. 1, storage and converter stations 10 are illustrated as disposed on a natural body of water 12. The storage and converter stations 10 are located on waterborne vehicles 22 and are disposed offshore of the land 18. Although it is contemplated that the storage and converter stations 10 constitute waterborne vehicles, such as barges, it should be noted that the use of a land base storage and converter station could be utilized, depending upon the exact circumstances of their use.

A plurality of storage and converter stations 10 are utilized in the embodiment shown in FIG. 1. The storage and converter stations 10 include a storage and converter station 10a located offshore of the land 18, storage converter station 10b located in the path of sewage flowing into the natural body of water 12, and storage and converter station 10c located in the polluted river 14. The locations of the storage and converter stations 10 are such that they will be operable to effect oxidation of pollutants that are in or are flowing into the natural body of water 12.

Each storage and converter station 10 includes a supply of liquid oxygen. The supply preferably consists of a container or tank 20 located on a waterborne vehicle 22. The liquid oxygen flows from the container 20 to an atmospheric heat exchanger 24. The atmospheric heat exchanger 24 volatilizes the liquid oxygen and passes it through a conduit 26 to a servo valve 28. The servo valve 28 directs the flow of gaseous oxygen to either an ozonator assembly 30 or to a conduit 32. From the ozonator 30 or the conduit 32, the gaseous oxygen, with or without ozone, passes to a conduit 34. Oxidation additives, in the form of oxidation catalysts and oxidation agents, are stored in a container 36 and are directed into conduit 34 by a valve 38. From the valve 38, the flow of gaseous oxygen and additives is directed into a conduit 40 which is disposed beneath the surface of the water body 12. The conduit 40 is connected at its outer end to a diffuser member 44 for diffusing the oxygen and the other additives into the water. A sensor unit 46 is operable to sense the water conditions and apply a control signal to a control or monitoring device 48. The control or monitoring device 48 then controls the servo valve 28, the ozonator 30, and the valve 38 in response to conditions sensed in the water. A power source 50 is also located on the waterborne vehicle 22 and is operable to meet the power requirements of the apparatus thereon.

The container 20 for the storage of liquid oxygen and the atmospheric heat exchanger 24 preferably is known as a cryogenic liquid customer station, such as the Model CLC–105 available from Air Products and Chemicals Incorporation, of Allentown, Pennsylvania. The cryogenic liquid customer station, illustrated in dotted lines and designated 52, is operable to convert the liquid oxygen to gaseous oxygen in a well-known manner. The output of the cryogenic liquid customer station 52 is gaseous oxygen delivered through the conduit 26. The cryogenic liquid customer station includes a pressure regulation system that is operable to control the gaseous oxygen so that it is delivered to conduit 26 at a constant pressure independent of the level of the oxygen in the tank 20 or the temperature of the atmosphere. The oxygen storage container 20 is of a double-walled construction for storing the liquid oxygen without excessive heat absorption. The inner vessel 54 is constructed of a material which is suitable for cryogenic liquid service and is able to withstand temperatures of —320° F. Disposed around the inner vessel 54 is an outer vessel 56. A vacuum space 55 is disposed between the inner and outer vessels and will be filled with vacuum filler material, such as compacted perlite or sanocel. The construction of the container 20 is such that it will be able to hold the liquid oxygen with a minimal amount of heat leakage.

The atmospheric heat exchanger 24 can be constructed externally of the liquid oxygen container 20. The atmospheric heat exchanger comprises a coil through which oxygen flows and a plurality of fins 24a attached thereto. The fins 24a absorb heat from the atmosphere and transmit it to the liquid oxygen that passes through the heat exchanger coil. The liquid oxygen is then heated by the heat from the atmosphere and is volatilized to its gaseous state.

The use of a liquid oxygen storage container allows the storage of large quantities of liquid oxygen, since the containers are commercially available to hold over ten thousand gallons of liquid oxygen. The advantage of using a liquid oxygen storage facility is that large amounts of oxygen can be stored in a relatively small volume. To store a similar amount of oxygen in its gaseous state would require a container that is much larger than the container hereinabove described. Thus, by utilizing liquid oxygen, a much more economical container can be provided. Moreover, the conversion of liquid oxygen from its liquid state to its gaseous state by volatilization by the heat exchanger 24 can be accomplished without any power whatsoever. Gravity and/or pressurization of ullage is operable to force the liquid oxygen from the container 20 and the heat from the atmosphere is utilized to convert the oxygen to gas. Thus, the use of a container for storing liquid oxygen and an atmospheric heat exchanger to volatilize the liquid oxygen provides an economical and practical means to provide gaseous oxygen for the oxygenation of a natural body of water in situ.

The ozonator assembly 30 is provided to convert oxygen into ozone gas. The ozonator assembly or ozone generator 30 may be of the type such as the Model CLP Ozonator produced by Welsbach Corporation, in Philadelphia, Pennsylvania. The ozone generator 30 is preferably of the corona discharge type and produces ozone by exposing the oxygen gas to an electrical discharge. The oxygen gas which is under a high pressure in the conduit 26 is forced into the ozonator 30 if the servo valve 28 is actuated. While the oxygen gas passes through the ozonator 30, it is subjected to a high voltage electrical discharge which converts a small portion of the gas to ozone. The ozone and oxygen gas are then passed into the conduit 34.

The purpose of the addition of ozone is to accelerate direct chemical oxidation of the pollutants in the water. Ozone is a powerful oxidation agent and is not as temperature sensitive as to its rate of reaction as is the biochemical oxidation using pure oxygen. Therefore, it is contemplated that when the temperature of the water drops, such as during the winter months where biochemical oxidation efficiency is reduced proportionally with the reduction of water temperature, the ozone generator will be operated to convert approximately 1.5% to 2.5% of the gaseous oxygen to ozone. When the water temperature increases, or other conditions change, then the servo valve 28 will be actuated to allow the gaseous oxygen to by-pass the ozonator 30, as will be described below. It should be noted that when the ozone generator 30 is operated, it will have a power requirement of about 4 kilowatts per pound of ozone produced. However when the ozonator 30 is inactive, no power requirements will be needed to disperse the gaseous oxygen into the water. Although, generally, the ozonator 30 will be utilized during the winter months, it could be utilized at any time during the summer months when the desirability of ozonation is indicated by septic conditions or refractory organic spill in the water being treated.

Substantially pure oxygen gas or oxygen gas containing ozone is directed into the conduit 34 and to the valve 38. The valve 38 is connected with the container 36 which stores matter or additives other than ozone. The additives will be gaseous or vaporous oxidation agents and catalysts, and could include the oxides of nitrogen, carbon dioxide, phosgene, perchloric acid, chlorine, the oxides and halides of chlorine, cyanic acid, hydrogen peroxide, hydrogen phosphide, iodine, lithium perchlorate, lithium chlorate, nitryl chloride, phosphonium chloride, hypophosphoric acid, halides of phosphorus, phosphorus trioxide, and similar materials. It is contemplated that the oxidation catalysts and agents can be added to the water when septic or other conditions of the water warrant. The agents and catalysts will be operable to increase the number of reactants and increase the speed and efficiency of the oxidation process in the natural body of water in situ.

Although a single additive container 36 is illustrated, it should be realized that a plurality of containers could be provided so that a plurality of oxidation agents and catalysts could be utilized to increase the speed of the oxidation of pollutants. Preferably, the oxidation catalysts and agents could be stored in their gaseous or vaporous forms within the container 36 and would flow from the container 36 through the valve 38 and into the diffuser line 40 without the consumption of any power. However, the oxidation agents and catalysts could be stored in other forms and converted to their vaporous state.

After the addition of oxidation agents and catalysts to the oxygen gas, if desired, and/or the conversion of a portion of the oxygen gas to ozone, the oxygen gas with additives is directed through the flexible diffuser line 40 to the diffuser member 44. Because the oxygen gas is initially under high pressure when it exits the atmospheric heat exchanger 24 via the conduit 26, no pumps or other power requirements are needed to diffuse the oxygen gas and the additives therein into the water. The diffuser member 44 is constructed so as to be of the anti-fouling type and so as to depart a maximum amount of dissolved oxygen and other additives therein to the water. The diffuser member is an elongate type having a plurality of openings for directing the gas into the water. Diffusers, such as the type manufactured by Walker Process Equipment Company, Aurora, Illinois, could be used in the present system.

A water-quality monitoring system 48 is disposed on the waterborne vehicle 22 and is operable to receive automatic measurements of the water conditions and to control the operation of the apparatus in response to the conditions of the water. The monitoring system could be such as the Model RM–25 Robot Monitor of Schneider Instrument Company, Cincinnati, Ohio. The sensor or detector 46 is provided to sense the conditions of the water and relay these conditions via the line 45 to the control and monitor station 48. The sensor 46 is disposed adjacent the diffuser 44 and is operable to sense the water conditions adjacent thereto. The sensor 46 is operable to sense conditions of the water such as conductivity, dissolved oxygen, turbidity, pH, oxidation-reduction potential, dissolved chlorides, temperature, and related atmospheric parameters. The sensor, when the various conditions indicate, provides a signal which results in controlling valve 28, ozonator 30 and valve 38.

Another sensor or detector 60 is disposed away from the waterborne vehicle 22 near or at the surface of the natural body of water and is operable to sense the dissolved oxygen in the water. Preferably, sensor 60 is similar to the Model 735 Dissolved Oxygen Analyzer produced by Beckman Instruments Incorporated, Fullerton, California. The sensor 60 or dissolved oxygen analyzer is operable to sense an oversaturation of the natural body of water which would result in oxygen being lost to the atmosphere. The dissolved oxygen analyzer is operable, upon sensing an oversaturation of oxygen in the water, to direct a signal through the line 62 to the control and monitor station 48. The monitor station 48 then controls valve 28 to cease or reduce oxygen flow to the diffuser 44, thereby ceasing or reducing the diffusion of oxygen into the water. While only a single sensor 46 and a single dissolved oxygen sensor 60 is illustrated, it should be realized that a plurality of either type of sensor may be utilized to sense conditions of the water or bubble-off of oxygen at different points near the storage and converter station 10.

As noted above, the function of the control and monitor system 48 and sensors 46, 60 is to monitor the water conditions and control the addition of oxygen and oxidation agents and catalysts to the water. The sensors 46, 60 sense the water condition and feed signals representative thereto to the control and monitor station 48. The control and monitor station 48 then analyzes the signals to determine whether more oxygen should be dissolved in the water, whether a portion of the oxygen should be converted to ozone or whether oxidation catalysts or agents in addition to, or instead of ozone should be added to the oxygen. After making a determination of what needs to be done, the control and monitoring system 48 then takes the necessary steps to activate the required equipment.

For example, if a temperature drop is sensed by sensor 46 and the need for ozone is established, then the control and monitor system 48 will energize the solenoid valve 28 via the connection 29 to allow the oxygen gas to pass from the conduit 26, to the conduit 31 and into the ozonator 30. At the same time, the control and monitor system will activate the ozonator 30 by directing a signal through the line 33. The gaseous oxygen is then partially converted to ozone and passed from the ozonator 30, through the conduit 35, through the conduit 34, to the valve 38. If it is also desired to add oxidation catalysts or agents because of changing water conditions, then the control and monitor system 48 activates the valve 38 via the connection 39 to allow gaseous oxidation catalysts and agents to be mixed with the gaseous oxygen and ozone. The gaseous mixture then passes into the diffuser conduit 40 and flows from the diffuser 44 into the water.

In view of the fact that the various components of the system described are known as indicated, these components will not be described in detail. Moreover, the interconnection of those components is only shown schematically for purposes of simplicity.

As noted above, it is desirable to dissolve oxygen in the water to a concentration at, or below, the equilibrium concentration established by the partial pressure of the oxygen in the atmosphere so that oxygen will not be lost to the atmosphere from the water. The sensor 60 is operable to sense the degree of oxygen dissolved in the water and overrides the sensor 46 when there is a bubble-off condition of the oxygen into the atmosphere, or when such a condition is approaching. This allows the storage and converter station 10 to operate at peak efficiency and economy in that it operates to maximize the concentration of the oxygen in the body of water to a point just below the point at which the dissolved oxygen will bubble-off to the atmosphere. Thus, oxygen will not be wasted by the occurrence of a bubble-off condition and a maximum concentration will be maintained to thereby maximize the oxidation of pollutants. However, because of absorption and adsorption by organic pollutants, entrapment under thermoclines, reaction with ambient reducing agents, and lateral diffusion and other factors, higher concentrations of dissolved oxygen may be efficiently produced locally in the waters of the diffusion area without loss to the atmosphere. Thus, because of certain water conditions, it might be possible to oversaturate the water locally and still not have bubble-off of oxygen. Moreover, as can be seen in FIG. 1, dilution of the dissolved oxygen by water currents can present situations where the water can be supersaturated without loss of oxygen to the atmosphere. Thus, it can be seen that during certain water conditions, it will be desirable to supersaturate the water with dissolved oxygen. However, supersaturation should only be utilized when the conditions of the water and the atmosphere allow the supersaturation without substantial loss of oxygen from the body of water to the atmosphere.

To provide power for the sensors 44, 60, the ozonator 30, the control and monitoring system 48 and any other equipment disposed on the storage and converter station 10 which has power requirements, a power source 50 is located on the waterborne vehicle 22. The power source 50 could comprise fuel cells, batteries, or generators, or any combination thereof. Preferably, a diesel generator is provided as the power source 50 to provide power for the ozonator 30. Batteries, or fuel cells, could be provided to fulfill the minimal power requirements of the rest of the apparatus.

It should be realized that the described apparatus is operable with minimal power requirements when the ozonator 30 is not being utilized, which is a majority of the time. Because liquid oxygen is being utilized, the gaseous oxygen that is volatilized will be under a high pressure. As noted, high pressure will enable the gaseous oxygen and any additives thereto to be delivered deep into the water without the need of pumps or compressors, as utilized in the prior art.

Since pumps and compressors are not required by the present system, a very economical system requiring minimal equipment and power is provided. Moreover, because the present system utilizes minimal equipment, lower maintenance costs are expected and it is not necessary to provide an operator onboard to service continuously running equipment subject to mechanical failure. In fact, the present system needs only very sporadic maintenance and the system can operate over a period of weeks without the need of human supervision. The only regular maintenance that the system requires is that of refilling the oxygen tanks and the additive tanks which will generally need refilling at periods of a week or longer.

It should be clear that it is intended that the concepts disclosed herein provide optimum flexibility in that the complete storage converter stations 10 can be moved from location to location by tugs or by self-contained propulsion systems as the rate of flow of pollutants and of the currents in a body of water vary so that oxygen input capability quickly varies at any point. Although the majority of the storage converter and diffusion stations could be located on barges docked near the river mouths or anchored near shore, some should be upriver below heavy pollutant influent points, and some on shore and on river banks.

From the above, it can be seen that the present invention provides for oxygenation of a natural body of water in situ with pure oxygen and additives. The importance of dissolved oxygen in a natural body of water cannot be overemphasized. Fish and other types of aquatic life require the presence of dissolved oxygen to live. The presence of pollutants in the water reduces the dissolved oxygen content and effects a decrease in desirable aquatic life. The prime and immediate benefit of increasing the dissolved oxygen content in the water is pollution alleviation prior to any chemical action resulting therefrom. It should be noted that pollutants per se do not necessarily cause a decrease in desirable aquatic life, such as fish, but rather it is the low dissolved oxygen content that results from the biochemical activities caused by the pollutants that effects the decrease. Thus, the presence of pollution in large quantities in a natural body of water effects a deficit of dissolved oxygen which, in turn, causes the quality of the water body to deteriorate.

Figure 2:
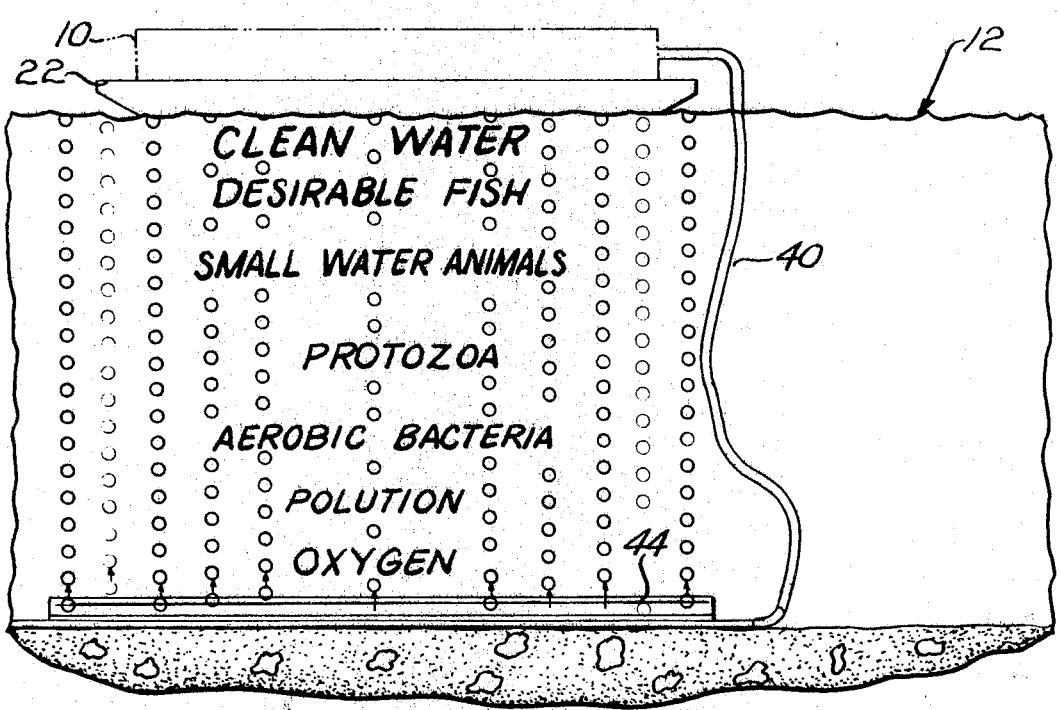
FIG. 2 is a graphical illustration of the effects of oxygenation of a natural body of water in situ.

Thus, it can be seen that as organic pollutants in a body of water increase, the dissolved oxygen content of the body of water is decreased by the aerobic biological activity which purifies the water. As illustrated in FIG. 2, dissolved oxygen is provided to a natural body of water in situ. The dissolved oxygen is diffused throughout the pollutants and effects biochemical oxidation of the pollutants by aerobic bacteria. The bacteria, which includes native bacteria oxidize the pollutant materials and convert the pollutants to nontoxic carbon dioxide, water, nitrogen gas, and nitrate and sulphate ions. The pollutional organic material which is transformed by the agency of bacteria and partially synthesized into bacterial cells is then, in turn, ingested and digested by protozoa. These, in turn, have their enemies in the form of small water animals, such as rotifers, water fleas, and crustaceans. As the polluted water is purified, the organic matter originally present in the pollution is successively attacked and gives rise to the growth of different forms of life until it becomes food for small and large fish.

The oxidation of pollutant materials occurs naturally in a body of water. However, in order for the natural process to purify the water, the dissolved oxygen content of the body of water must not be depleted. Depletion of the dissolved oxygen effects a decrease of desirable water organisms and animals and a decrease in the natural process of purification of the water. Therefore, it can be seen that oxygenation of a natural body of water in situ, as contemplated by the present invention, effects the creation of an aquatic environment that is both healthful and productive.

Moreover, it can be seen that if the present system is utilized, the minimum effect that it would have on a natural body of water would be that of reversing the pollutional condition. However, there is the distinct possibility that organic pollutional matter could be considered an asset in that the pollutional matter is converted to food for aquatic life by the oxygenation of the water in situ. Thus, it is a possibility that cities in the future might be asked to contribute larger organic loads of pollutants to the water rather than to build more efficient treatment plants. These organic loads would then be oxidized by aerobic bacteria to create a food for microscopic organisms. The microscopic organisms would in turn be consumed by larger aquatic animals, which would in turn provide food for desirable fish. Thus, the oxidation of large amounts of pollutants could cause an abundance of food for desirable species of fish and, therefore, the water bodies could be made to support market and game fish at high levels.

Having described our invention, we claim:

1. A method of supplementing the natural process of water purification in a natural body of water in situ, said method comprising the steps of providing a supply of substantially pure oxygen, locating a diffuser means at a predetermined depth beneath the surface of the natural body of water, transferring the oxygen to the diffuser means, directing the oxygen from the diffuser means into the body of water at a predetermined depth to effect oxidation of pollutants in the body of water, effecting the addition of a supplementary oxidative additive to the oxygen prior to flow thereof from the diffuser, and sensing the condition of the water, said step of effecting the addition of an oxidative additive being varied in response to sensing changing conditions of the water.

2. A method of supplementing the natural process of water purification as defined in claim 1 wherein said step of effecting the addition of an oxidative additive comprises the step of introducing gaseous oxidation catalysts or gaseous oxidizing agents to thereby increase the speed and efficiency of the biochemical oxidation and chemical oxidation of pollutants in the water.

3. A method of supplementing the natural process of water purification as defined in claim 1 wherein said step of effecting the addition of a supplementary oxidative additive comprises the step of adding ozone to the oxygen to thereby accelerate direct chemical oxidation of the pollutants.

4. A method of supplementing the natural process of water purification in a natural body of water in situ, said method comprising the steps of providing a supply of liquid oxygen in a container, transferring the liquid oxygen from the container to a heat exchanger, volatilizing the liquid oxygen from its liquid state to a gaseous state in the heat exchanger, locating a diffuser means at a predetermined depth beneath the surface of the natural body of water, transferring the gaseous oxygen to the diffuser means, and directing the gaseous oxygen to flow from the diffuser means into the body of water to thereby oxygenate the water and effect oxidation of pollutants in the water.

5. A method of supplementing the natural process of water purification as defined in claim 4 further including the steps of sensing the dissolved oxygen in the water and controlling said volatilizing of the oxygen in accordance therewith.

6. A method of supplementing the natural process of water purification as defined in claim 5 further including the step of adding ozone to the body of water in situ to thereby accelerate chemical oxidation of pollutants in the water.

7. A method of supplementing the natural process of water purification in a natural body of water in situ, said method comprising the steps of providing a supply of oxygen, transferring the oxygen from the supply to a diffuser means, locating the diffuser means at a predetermined depth beneath the surface of the natural body of water, allowing the oxygen to flow from the diffuser means into the body of water to thereby effect oxidation of pollutants in the body of water, sensing the temperature of the water, and controlling the flow of oxygen from the diffuser means as a function of the temperature of the water to control the concentration of oxygen in the water.

8. A method of supplementing the natural process of water purification as defined in claim 7 wherein the step of controlling the flow of oxygen from the diffuser member further includes the step of maintaining the concentration of the oxygen in the water approximately at or below the equilibrium concentration of the oxygen in the water at an interface between the body of water and the surrounding atmosphere.

9. A method of supplementing the natural process of water purification as defined in claim 7 further including the step of adding ozone to the body of water in situ to thereby accelerate direct chemical oxidation of pollutants in the water.

10. A method of supplementing the natural process of water purification in a natural body of water in situ, said method comprising the steps of providing a supply of liquid oxygen in a container, volatilizing liquid oxygen to form gaseous oxygen, transferring the oxygen from the container to a diffuser means, locating the diffuser means at a predetermined depth beneath the surface of the natural body of water, allowing the oxygen to flow from the diffuser means into the body of water to thereby effect oxidation of pollutants in the body of water, and controlling the flow of oxygen from the diffuser means to control the concentration of oxygen in the water, said step of controlling the concentration of oxygen in the water including in part the controlling of the rate of said volatilizing of the oxygen.

11. Apparatus for supplementing the natural process of water purification in a natural body of water in situ, said apparatus comprising means providing a supply of oxygen comprising a container having liquid oxygen therein, an atmosperic heat exchanger for converting the liquid oxygen to its gaseous state, means for directing oxygen from the supply into the natural body of water to thereby increase the natural process of oxidation of pollutants in the water, means providing for the addition of an oxidative additive to the natural body of water simultaneously with the oxygen, control means for controlling the conversion of oxygen from its liquid to its gaseous state in response to conditions of the water, and sensing means for sensing the conditions and controlling said control means.

12. Apparatus for supplementing the natural process of water purification as defined in claim 11 wherein said means providing for the addition of an oxidative additive comprises an ozone generator operatively associated with said heat exchanger and operable to convert a portion of said oxygen to ozone.

13. Apparatus for supplementing the natural process of water purification as defined in claim 11 wherein said control means includes a valve means operable to control the flow of oxygen from said heat exchanger, said valve means being controlled by said sensing means, and wherein said sensing means is operable to sense water conditions and control said valve means to thereby control the flow of oxygen into the water and thereby control the oxygen concentration in the body of water so that the oxygen lost to the atmosphere from the surface of the water will be minimized.

14. Apparatus for supplementing the natural process of water purification as defined in claim 13 wherein said sensing means includes first detector means for sensing the temperature of the water at the depth at which oxygen is diffused into the water to control the rate of $O_2$ input into the water in relation to its absolute solubility in the water as determined by temperature.

15. Apparatus for supplementing the natural process of water purification as defined in claim 14 wherein said sensing means further includes second detector means for sensing the dissolved oxygen in the water at the surface thereof and operable to override said first detector means.

16. Apparatus for supplementing the natural process of water purification in a natural body of water in situ, said apparatus comprising means for storing liquid oxygen, means for volatilizing the liquid oxygen, said means for volatilizing including a heat exchanger operable to convert the liquid oxygen to its gaseous state, and means for adding the gaseous oxygen to the natural body of water in situ to thereby oxygenate the water.

17. Apparatus for supplementing the natural process of water purification as defined in claim 16 further including controlling means for controlling the conversion of oxygen from its liquid state to its gaseous state to thereby provide the optimum absorption of oxygen at the specific water condition in which the apparatus is utilized.

18. Apparatus for supplementing the natural process of water purification as defined in claim 16 wherein said controlling means is controlled by a sensing means, said sensing means being operable to sense the condition of the water and to vary the operations of said controlling means in response to changing water conditions so that said controlling means is operable to control the flow of oxygen to the water and prevent the oxygen content of the body of water from exceeding its equilibrium concentration so that the oxygen lost to the atmosphere will be minimized.

19. Apparatus for supplementing the natural process of water purification as defined in claim 17 further including an ozone generator operable to convert a portion of said oxygen to ozone to thereby accelerate direct chemical oxidation of pollutants in the water.

20. Apparatus for supplementing the natural process of water purification in a natural body of water comprising means for providing a supply of oxygen, a diffuser member located beneath the surface of the natural body of water, means for directing oxygen from said supply to said diffuser member from which oxygen is directed into the body of water, and means operable to control the flow of oxygen into the water to maintain the concentration of oxygen in the water at or below the equilibrium concentration established by the partial pressure of the oxygen in the atmosphere whereby the oxygen lost to the atmosphere from the water is minimized, said means operable to control the flow of oxygen into the water includes a sensing means for sensing the condition of the water and a valve means, said sensing means including a first detector means for sensing the temperature of the water at a depth at which oxygen is diffused into the water, said valve means being controlled by said sensing means and being operable to vary the flow of oxygen into the water in response to changing water condition sensed by said sensing means.

21. Apparatus for supplementing the natural process of water purification as defined in claim 20 wherein said sensing means further includes second detector means for sensing the dissolved oxygen content in the water at the surface thereof and operable to override said first detector means.

22. A method of supplementing the natural process of water purification in a natural body of water in situ, said method comprising the steps of providing a supply of substantially pure oxygen, locating a diffuser means at a predetermined depth beneath the surface of the natural body of water, transferring the oxygen to the diffuser means, directing the oxygen from the diffuser means into the body of water at a predetermined depth to effect oxidation of pollutants in the body of water, and effecting the conversion of a quantity of the oxygen to ozone prior to flow thereof from the diffuser, said quantity of oxygen converted to ozone being less than 5 percent of the quantity of oxygen flowing from the supply.

23. A method of supplementing the natural process of water purification in a natural body of water in situ and having an interface with the atmosphere, said method comprising the steps of providing a supply of oxygen, transferring the oxygen to a diffuser means, locating the diffuser means at a predetermined depth beneath the surface of the natural body of water, allowing the oxygen to flow from the diffuser means into the body of water to thereby effect oxidation of pollutants in the body of water, and controlling the flow of oxygen from the diffuser means to control the concentration of oxygen in the water, said step of controlling the flow of oxygen from the diffuser member including the step of maintaining the concentration of the oxygen in the water at the interface between the body of water and the atmosphere approximately at the equilibrium concentration of the oxygen in the water.

24. Apparatus for supplementing the natural process of water purification in a natural body of water having an interface with the atmosphere comprising means for providing a supply of oxygen, a diffuser member located beneath the surface of the natural body of water, means for directing oxygen from said supply to said diffuser member from which oxygen is directed into the body of water, and means operable to control the flow of oxygen into the water to maintain the concentration of oxygen in the water adjacent the interface approximately at the equilibrium concentration of oxygen in water whereby the oxygen lost to the atmosphere from the water is minimized.

25. Apparatus for supplementing the natural process of water purification as defined in claim 24 wherein said means operable to control the flow of oxygen into the water includes a sensing means for sensing the concentration of oxygen in the water and a valve means, said valve means being controlled by said sensing means and being operable to vary the flow of oxygen into the water in response to changing water conditions sensed by said sensing means.

References Cited

UNITED STATES PATENTS

| 3,234,123 | 2/1966 | Hinde | 210—7 |
|---|---|---|---|
| 3,342,727 | 9/1967 | Bringle | 210—15 |
| 2,771,416 | 11/1956 | Ryan | 210—62 |
| 3,235,234 | 2/1966 | Beaudoin | 210—17 X |
| 3,326,747 | 6/1967 | Ryan et al. | 210—64 X |

FOREIGN PATENTS 572,789  11/1958  Belgium.

MICHAEL E. ROGERS, Primary Examiner

U.S. Cl. X.R.

137—2; 210—63, 96, 170, 198; 261—124